Nov. 3, 1964 F. C. CHIANG 3,155,822
RECIRCULATING ADDER
Filed Oct. 2, 1961 10 Sheets-Sheet 1

INVENTOR.
FRANKLIN C. CHIANG
BY
Lippincott, Ralls & Hendricson
ATTORNEYS

INVENTOR.
FRANKLIN C. CHIANG

Nov. 3, 1964

F. C. CHIANG 3,155,822

RECIRCULATING ADDER

Filed Oct. 2, 1961

INVENTOR.
FRANKLIN C. CHIANG
BY
Lippincott, Ralls & Hendricson
ATTORNEYS

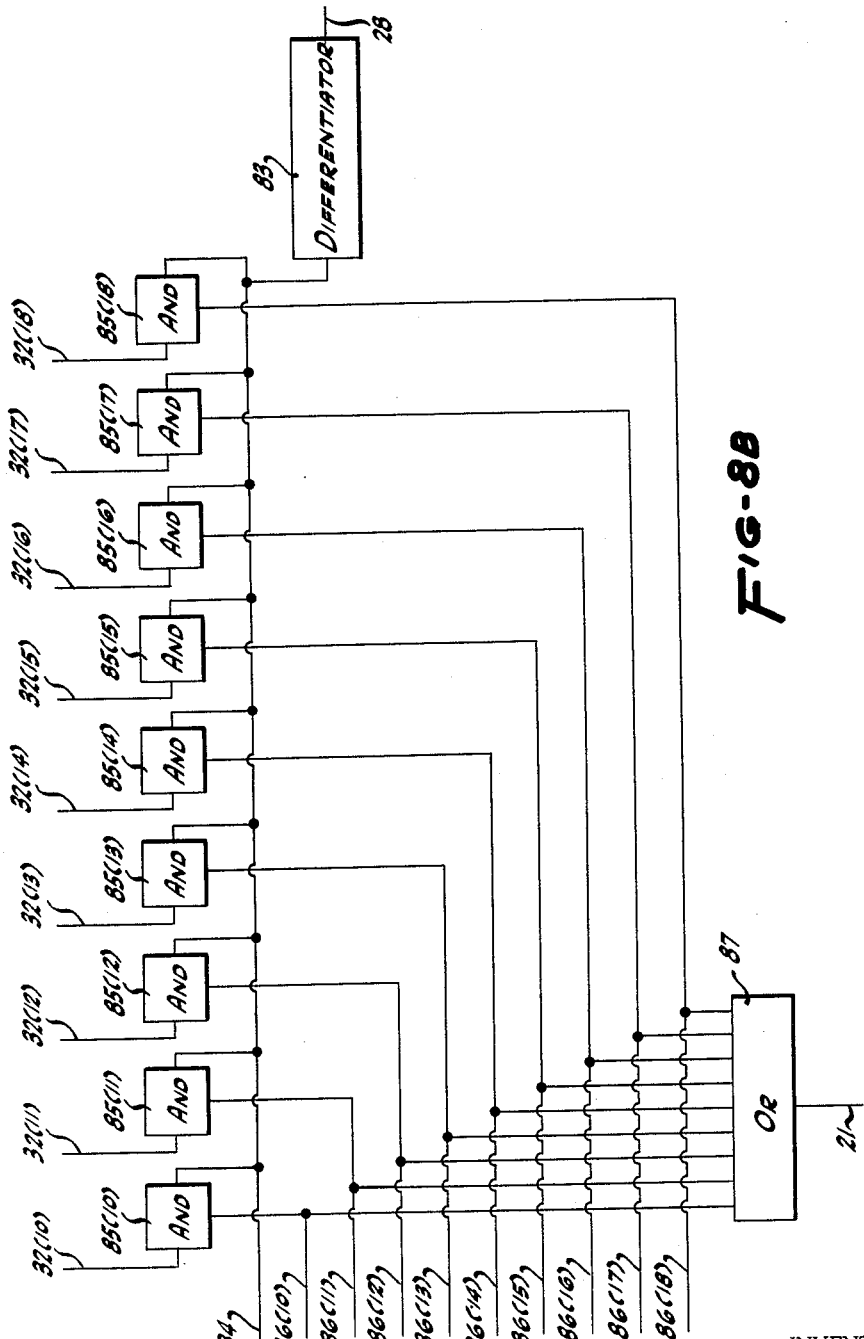

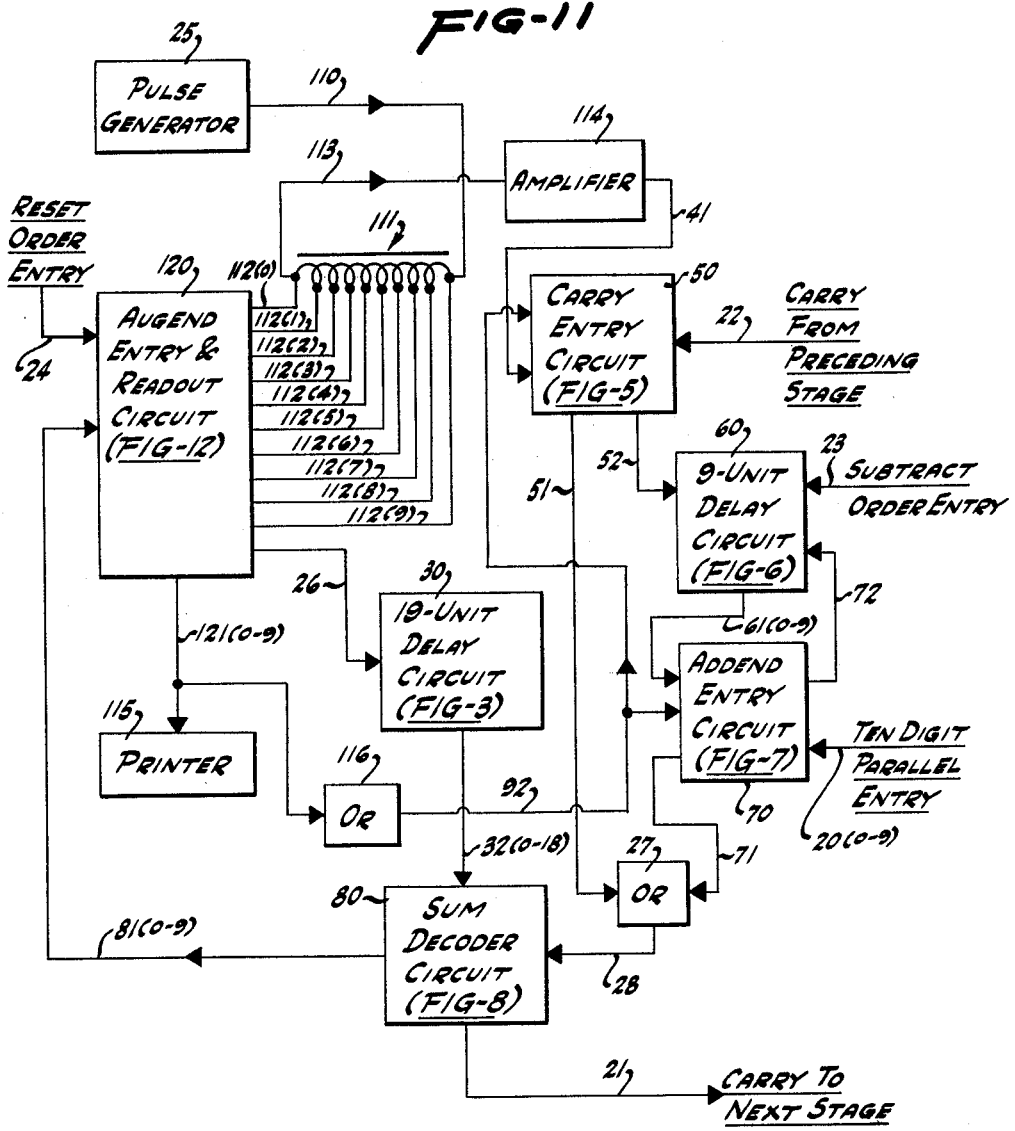

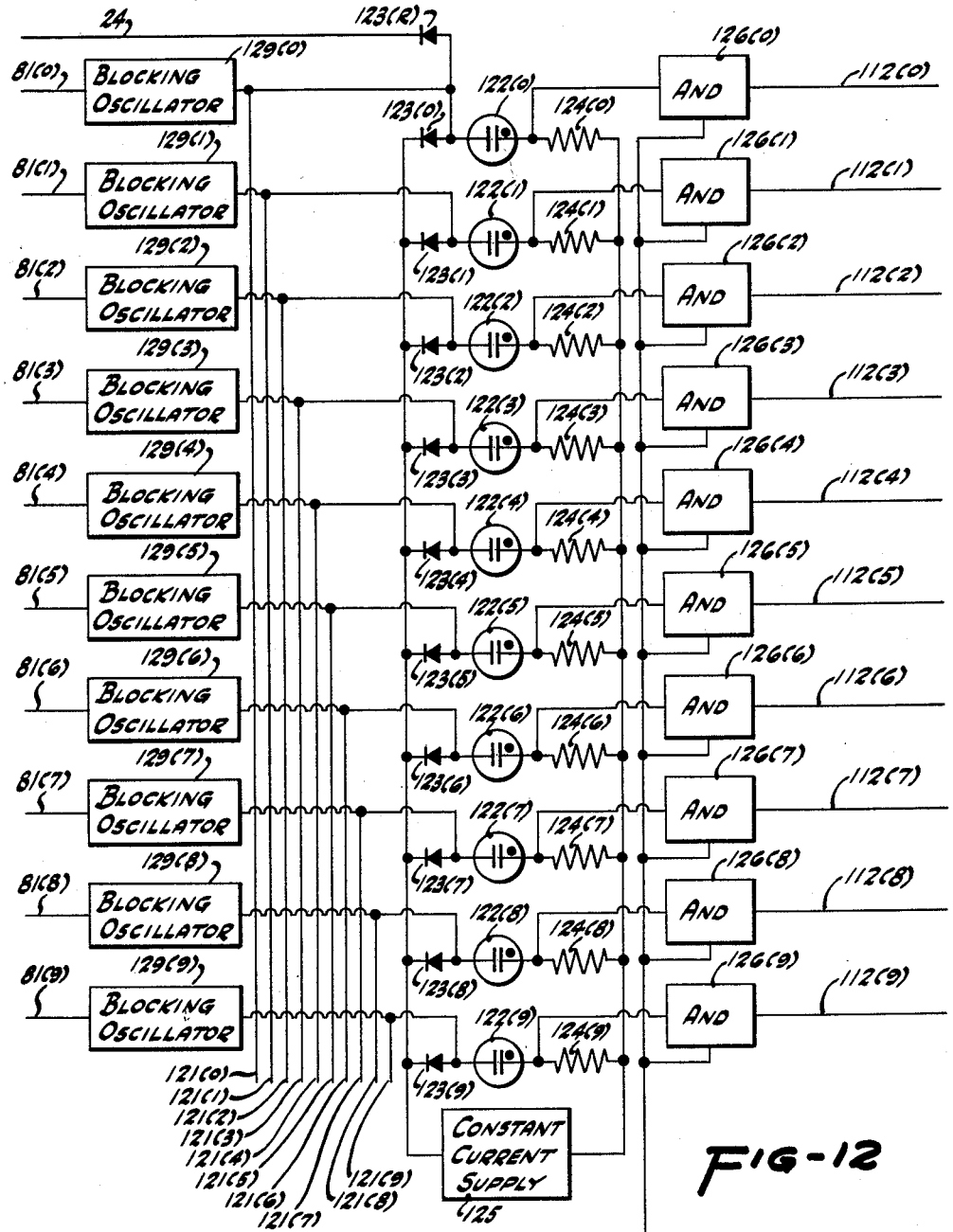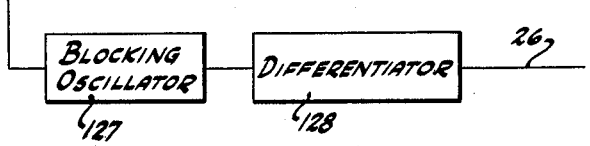
FIG-12

United States Patent Office 3,155,822
Patented Nov. 3, 1964

3,155,822
RECIRCULATING ADDER
Franklin C. Chiang, Palo Alto, Calif., assignor to International Control Machines of Santa Clara County, Mountain View, Calif., a corporation of California
Filed Oct. 2, 1961, Ser. No. 142,398
10 Claims. (Cl. 235—173)

This invention relates to high-speed electric adding and subtracting circuits, and particularly to recirculating adders for performing any number of successive additions and subtractions, accumulating the sums and differences, and automatically entering the latest subtotal as the augend or minuend for the next addition or subtraction.

Adders according to this invention incorporate augend entry circuits and addend entry circuits, each having memory provisions for temporary storage of the numbers to be added. (Subtraction is performed by adding the complement of the subtrahend, as hereinafter explained.) The augend and addend entry circuits are interconnected with a plurality of delay circuits, in such a way that the sum or difference of the stored numbers is translated into a time position of an electric pulse relative to a train of other pulses. This is decoded by coincidence means, and the subtotal is entered into the memory provisions of the augend entry circuit in preparation for the next addition or subtraction. Preferred arrangements for performing the necessary carry functions, clearing the memory provisions, and the like, are included in the exemplary embodiments hereinafter described.

One advantage of the recirculating adders provided by this invention is that they are easily adapted to any radix desired—the specific embodiments illustrated and described have been designed for radix ten. The modifications necessary to accommodate any other radix desired will be apparent to those skilled in the art. Another advantage is high speed—logic functions are performed by inherently fast-acting delay lines and gates, while inherently slower components, such as flip-flops, are employed only in the memory provisions where speed requirements are less severe. The flip-flops only need to have a rise-time equal to or less than the spacing between number pulses on the delay line. Still other advantages are compactness, reliability and economy resulting from the simplicity of circuitry relative to the operations performed.

The foregoing and other aspects and advantages of the invention may be better understood from the following illustrative description and the accompanying drawings. The scope of the invention is pointed out in the appended claims.

Figure 2:
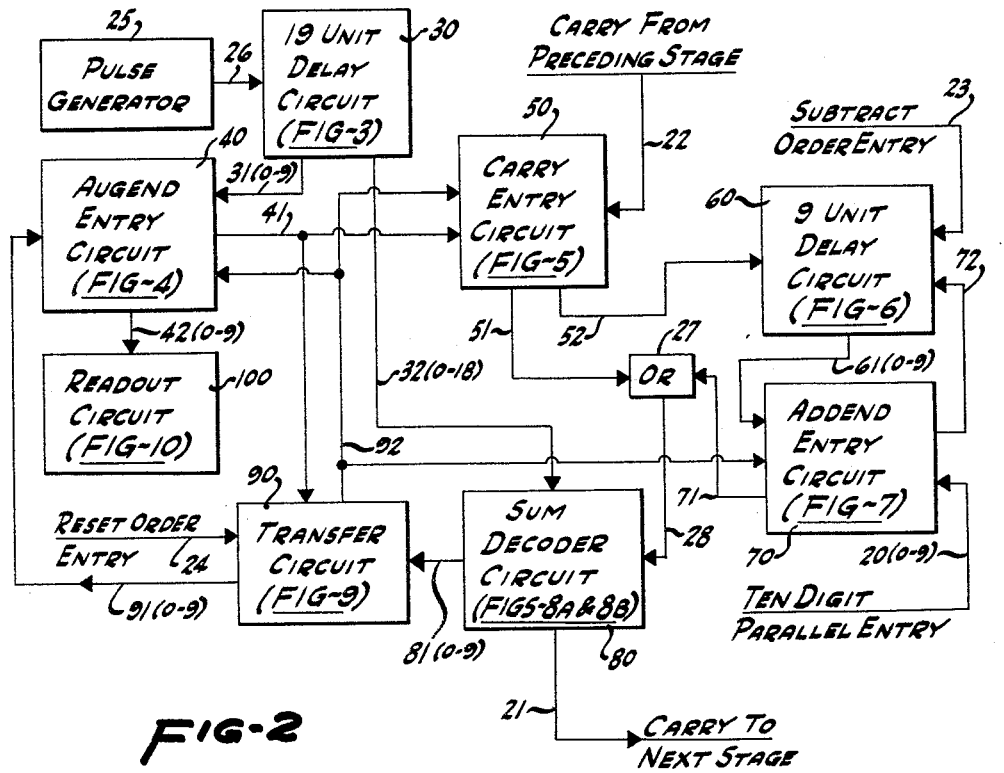
FIG. 2 is a schematic block diagram of a single stage of the adder shown in FIG. 1, various parts represented by blocks in FIG. 2 being more fully illustrated in FIGS. 3–10, as indicated.
Figure 8A:
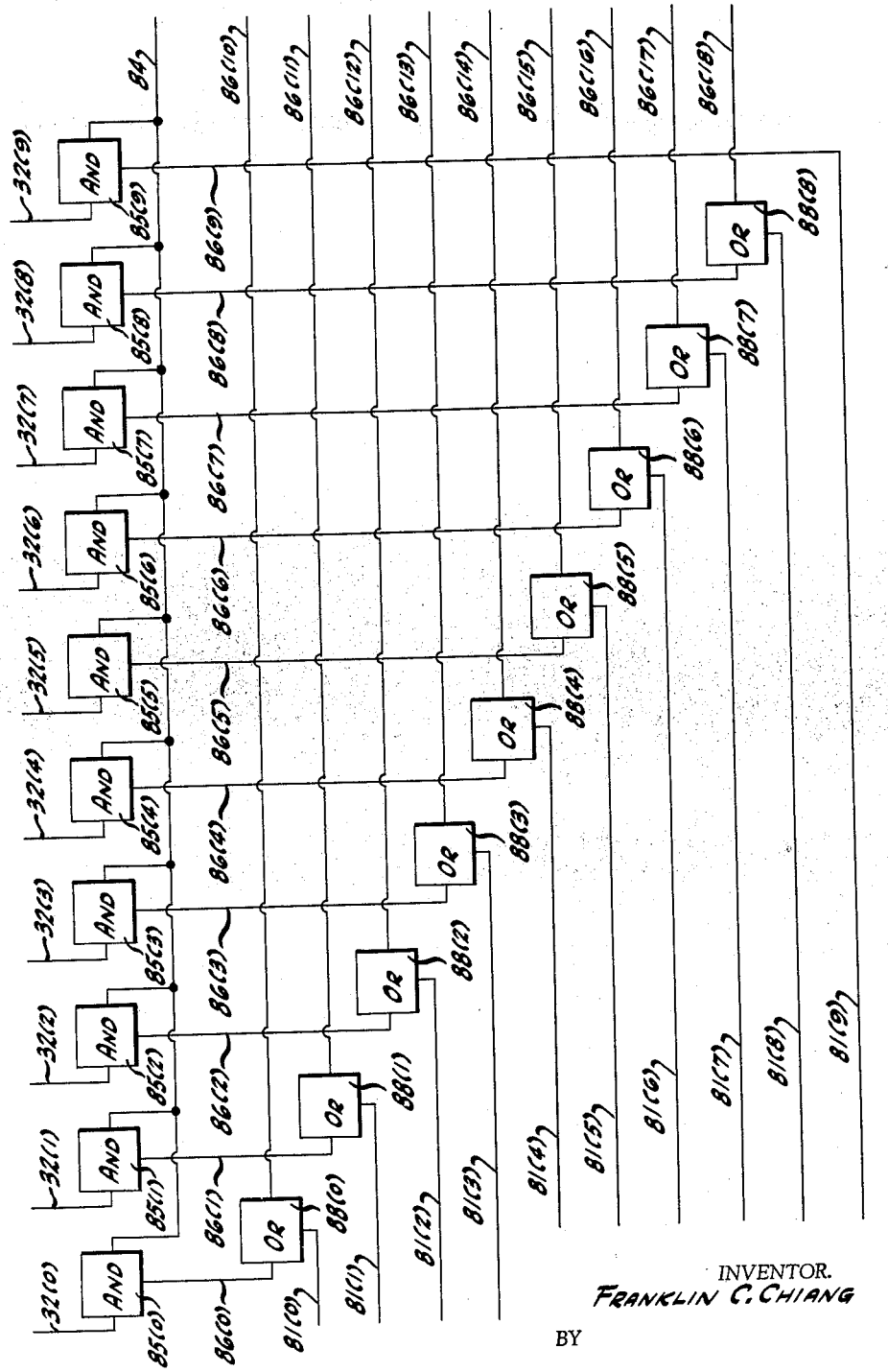

FIGS. 8A and 8B together constitute a schematic block and circuit diagram of the sum decoder circuit 80 of FIG. 2, the right end of FIG. 8A connecting directly to the left end of FIG. 8B.

Figure 9:
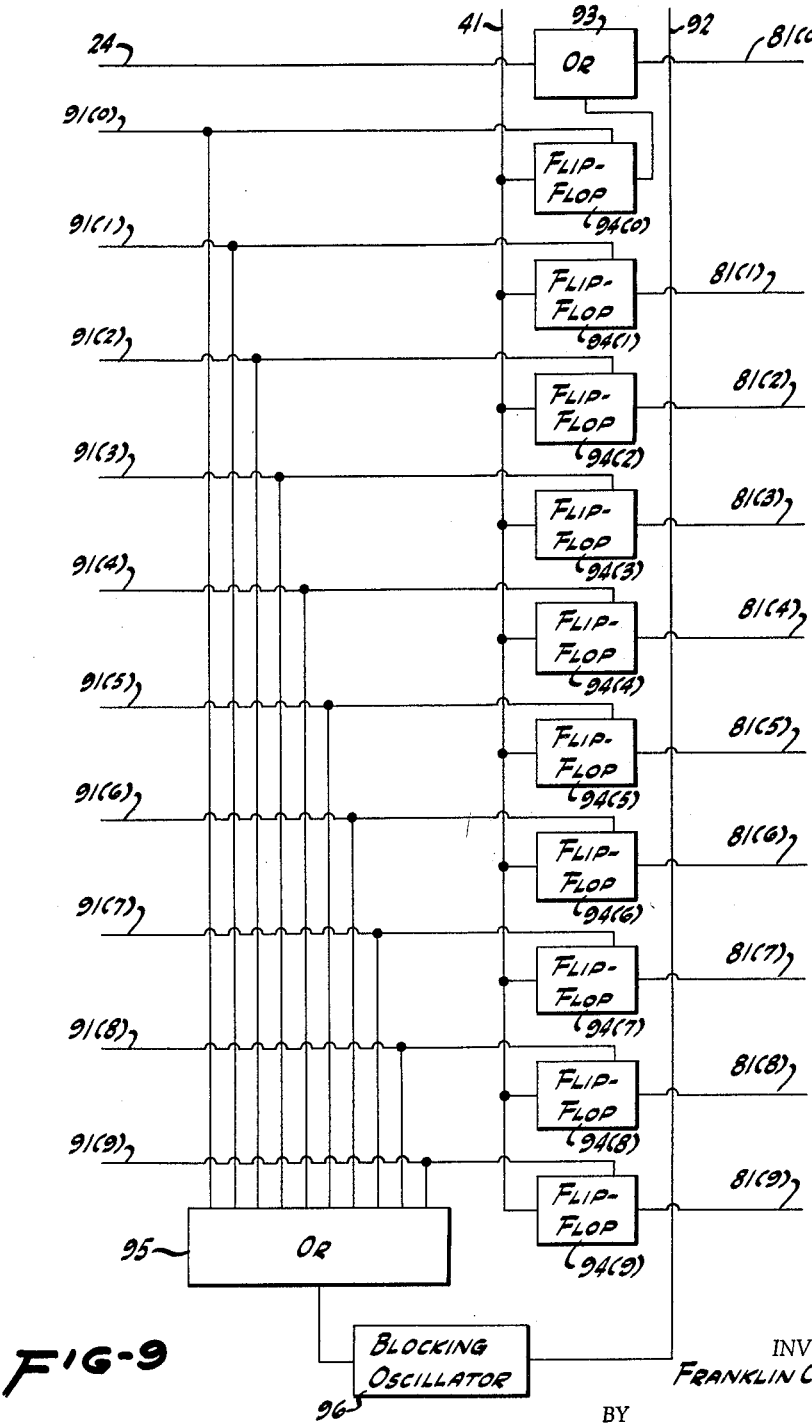

FIG. 9 is a schematic block and circuit diagram of the transfer circuit 90 of FIG. 2.

Figure 10:
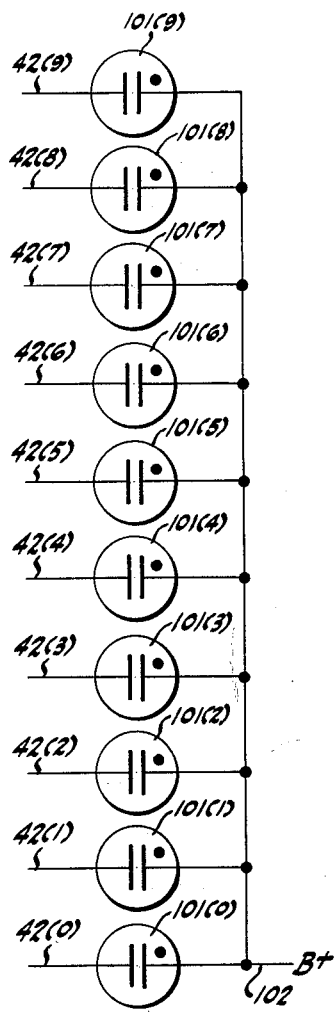

FIG. 10 is a schematic circuit diagram of the readout circuit 100 of FIG. 2.

FIG. 11 is a schematic block diagram illustrating an alternative adder stage incorporating the subcircuits illustrated in FIGS. 3, 5, 6, 7 and 8, together with an alternative augend entry and readout circuit 120, the parts being arranged somewhat differently and cooperating in a different manner from the stage shown in FIG. 2.

FIG. 12 is a schematic block and circuit diagram of the augend entry and readout circuit 120 of FIG. 11.

Figure 3:
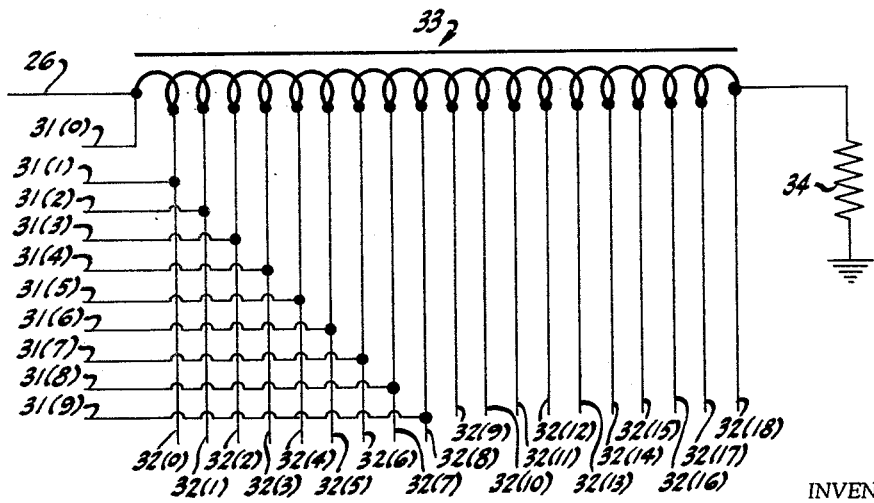
FIG. 3 is a schematic circuit diagram of the nineteen-unit delay circuit 30 of FIG. 2.

In a number of instances, duplicate parts are provided in the apparatus illustrated for electric signals representing different numerals—e.g., the ten digits zero to nine are entered into the addend entry circuit 70 of each stage by means of electric signals through ten identical, parallel leads. For convenience of reference, these ten leads are all represented by the reference number 20, followed by a parenthesis containing the numeral represented—that is, the lead for entering addend digit zero is identified by reference number 20(0), the lead for entering addend digit one is identified by reference number 20(1), etc. The group of ten parallel leads as a whole is identified by reference number 20(0–9). The same reference number system has been employed throughout the drawings. Also, parts that are best shown in FIG. 2 are identified by reference numbers 20 et seq., those best shown in FIG. 3 are identified by reference numbers 30 et seq., etc. Leads extending from parts in one figure to parts in another figure are numbered according to the figure in which they originate.

Conventional and-gates, or-gates, amplifiers, flip-flops, blocking oscillators, differentiating circuits, a pulse generator, a constant-current supply, and a printer are represented only by blocks, these conventional components being so well known to those skilled in the art that no further description is necessary. Numerous circuit variations and equivalents for these conventional components are also known and may be used. It will be understood that an and-gate provides a signal at its output lead only when signals are received at all of its input leads concurrently, and that an or-gate provides a signal at its output lead when a signal is applied to any of its input leads. A blocking oscillator provides an output pulse of fixed amplitude and duration whenever it is triggered by an input pulse—it can be replaced by equivalents, such as a one-shot multivibrator, or, in some cases, an amplifier.

Figure 1:
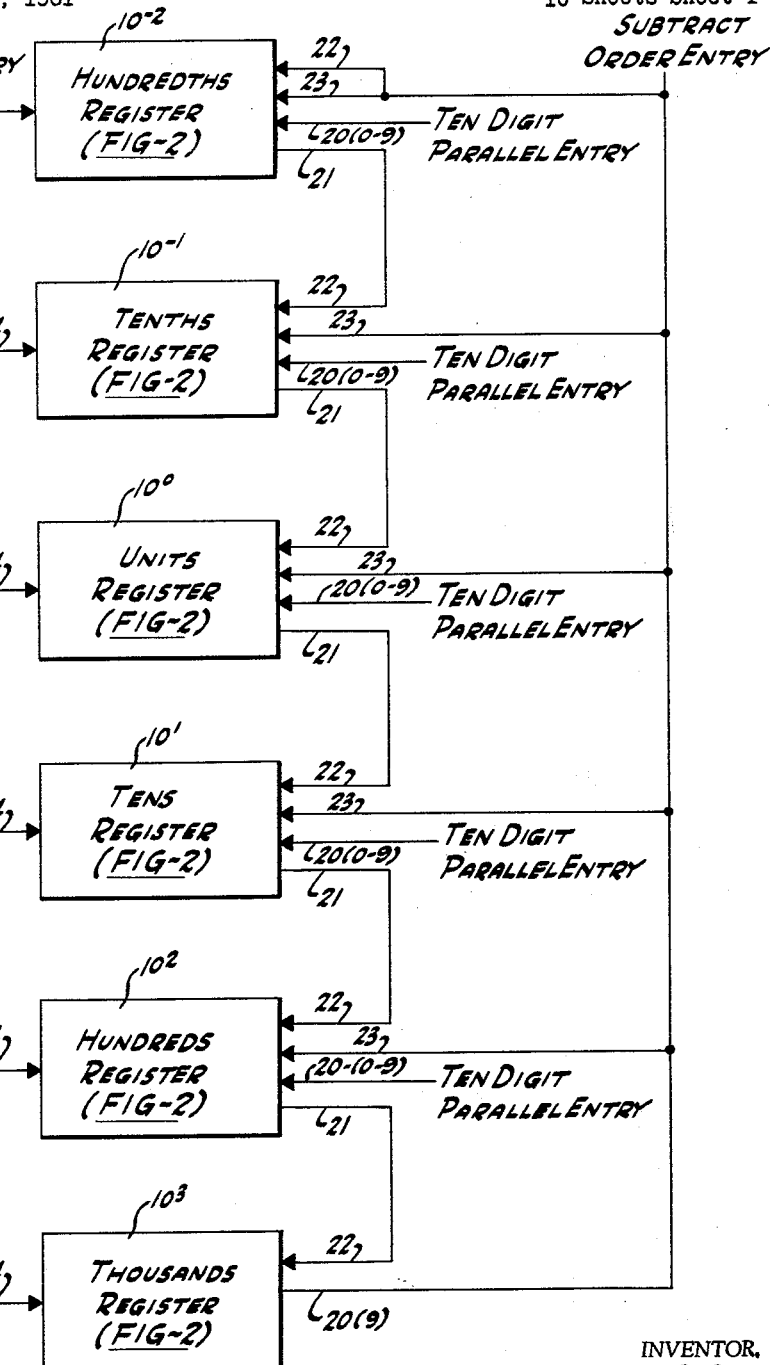
FIG. 1 is a schematic block diagram of a six-stage recirculating adder embodying principles of this invention, the six stages being essentially identical, there being one stage for each digit in a six-digit number of radix 10.

The six-stage recirculating adder illustrated in FIG. 1 is designed to operate in the familiar decimal number system, i.e., radix ten, to receive successive addend and subtrahend entries of up to five digits each, and to accumulate totals of up to six digits. Thus, the first register or stage, identified by reference number $10^{-2}$, may accept and register the hundredths digits (or cents), the second stage $10^{-1}$ may accept and register the tenths digits (dimes), the third stage $10^0$ may accept and register the units digits (dollars), the fourth stage $10^1$ may accept and register the tens digits, the fifth stage $10^2$ may accept and register the hundreds digits, and the sixth stage $10^3$ may accept and register the thousands digits.

Each of the first five registers or stages is provided with a group of ten (equal to the radix) parallel leads 20(0–9) that serve as a ten-digit parallel entry for receiving electric signals representing the ten digits zero to nine that are to be added or subtracted from the latest augend or subtotal digit previously accumulated in that register. Whenever a digit must be carried from one stage to the next, an electric signal is transmitted from a lead 21 of the stage in which the carry originates to the carry entry lead 22 of the next stage.

The six registers are so arranged that any five-digit number entered through the five groups of leads 20(0–9) will be added to the previously accumulated subtotal, unless an electric signal is concurrently supplied through the subtract order entry leads 23. As is more fully explained hereinafter, entry of a subtract order through leads 23 causes each register to add to the previously accumulated subtotal digit the difference between the number nine (one less than the radix ten) and the digit entered through leads 20(0–9). Concurrently with the subtract order entry, a carry signal is entered through lead 22 of the first stage $10^{-2}$, and the digit nine (one less than the radix) is entered through lead 20(9) of the last stage $10^3$, by means of the connections shown in FIG. 1. As a result, a subtract order entry causes the six-stage adder to add to the last previous subtotal the complement of the five-digit number concurrently entered through the five groups of leads 20(0–9).

For resetting the accumulated total to zero, an electric signal is supplied through the reset order entry leads 24 into each of the six stages.

The six stages of the adder preferably are identical, with the exception that parts associated with the unused entry leads 20(0–8) and 23 of the last stage $10^3$, and the unused carry output provisions of the last stage, may be omitted from that stage of economy. Also, if so desired, duplicate components, particularly pulse generator 25 and nineteen-unit delay circuit 30, may be combined into a common unit shared by all six stages. Otherwise, each of the six stages preferably conforms to the block diagram illustrated in FIG. 2.

Referring to FIG. 2, a pulse generator 25 periodically supplies an electric pulse through lead 26 to a delay circuit 30, which provides trains of pulses following one another at equal intervals of one time unit. One time unit may be any convenient period, e.g., one microsecond. The total delay provided by circuit 30, expressed in the chosen time units, is at least equal to twice the radix minus two (e.g., $2 \times 10 - 2 = 18$), and preferably is more, for reasons hereinafter explained. In the illustrated embodiment, circuit 30 provides a total delay of nineteen units. The pulse width, or duration, of the pulses supplied by generator 25 should be less than one time unit, and the pulse repetition period should be greater than the total nineteen-unit delay of circuit 30. Each pulse supplied through lead 26 initiates a new operating cycle. At least two such cycles should be available for each addition or subtraction; hence, the repetition period of the pulses supplied by generator 25 should be longer than one-half the minimum period between the entry through leads 20(0–9) of successive numbers to be added or subtracted.

A group of ten leads 31(0–9) leads from delay circuit 30 to the augend entry circuit 40. Responsive to each pulse received through lead 26, delay circuit 30 supplies a pulse to each of the ten (equal to the radix) leads 31(0–9) in succession, at intervals of one time-unit. In other words, approximately immediately after receiving a pulse through lead 26, circuit 30 transmits a pulse through lead 31(0) to circuit 40; one unit of time later circuit 30 transmits a pulse through lead 31(1) to circuit 40; etc.

A group of nineteen (one less than twice the radix) leads 32(0–18) connects delay circuit 30 to a sum decoder circuit 80, and responsive to each input pulse received through lead 26, delay circuit 30 transmits an electric pulse through each of the leads 32(0–18) in succession, at one-unit time intervals. For reasons that will become apparent as the description proceeds, it is preferable to provide a delay between the pulse transmitted through lead 31(0) and the pulse transmitted through lead 32(0). In the illustrated embodiment, this delay is one unit; hence a pulse is transmitted through lead 32(0) concurrently with the transmission of a pulse through lead 31(1), that is, approximately one time-unit after delay circuit 30 receives a pulse through lead 26. One time-unit after the pulse through lead 32(0), a pulse is transmitted through lead 32(1); and another time-unit later, a pulse is transmitted through lead 32(2); etc. Thus, there is a delay of nineteen time-units between the receipt of a pulse through lead 26 and transmission of the pulse through lead 32(18), and a nineteen-unit delay circuit is employed.

Digits entered in the augend entry circuit 40, as hereinafter explained, control connection of a selected one of the leads 31(0–9) to a lead 41, which connects circuit 40 to a carry entry circuit 50 and also to a transfer circuit 90. Thus, if the digit zero is stored in the memory provisions of augend entry circuit 40, a pulse is transmitted from lead 31(0) to lead 41 approximately immediately following the receipt of a pulse by delay circuit 30 through lead 26. If the digit one is stored in the augend entry circuit, then the pulse from lead 31(1) is transmitted to lead 41, etc. Hence, for each increase of one in the numerical value of the digit stored in augend entry circuit 40, the transmission of a pulse to lead 41 is delayed by one time-unit relative to the pulse supplied through lead 26 by the pulse generator, and the time position of the pulses transmitted through lead 41 is representative of the subtotal digit stored in the memory provisions of the augend entry circuit 40.

Responsive to each pulse transmitted through lead 41, carry entry circuit 50 transmits a pulse either through lead 51 or through lead 52, depending upon whether or not a carry digit has been stored in the memory provisions of carry entry circuit 50. For reasons that will become clear as the description proceeds, the carry entry circuit provides a delay of approximately two time-units between the receipt of a pulse through lead 41 and the transmission of a pulse through lead 51 when there is a carry digit to be added. When there is no carry digit to be added, circuit 50 provides a delay of approximately one time-unit between the receipt of a pulse through lead 41 and the transmission of a pulse through lead 52.

Responsive to each pulse transmitted through lead 52, a nine-unit delay circuit 60 transmits pulses through each of the ten (equal to the radix) leads 61(0–9) in succession at intervals of one time-unit. Each unit of delay provided by circuit 60 is equal to one unit of the delay provided by circuit 30, and the total number of delay units provided by circuit 60 is one less than the radix. If no subtract order entry has been received through lead 23, then a pulse is transmitted through the ten leads 61(0–9) successively in direct numerical order, i.e., a pulse is transmitted through lead 61(0) approximately immediately following the receipt of a pulse through lead 52, a pulse is transmitted through lead 61(1) one time-unit later, etc. If a subtract order entry has been received through lead 23, delay circuit 60 transmits pulses through leads 61(0–9) successively in inverse numerical order, i.e., transmits a pulse through lead 61(9) almost immediately after receipt of a pulse through lead 52, transmits a pulse through lead 61(8) one time-unit later, etc.

The addend (or subtrahend) digit is entered into the memory provisions of addend entry circuit 70 through the ten parallel leads 20(0–9). If the digit stored in the addend entry circuit is zero, a pulse is transmitted through lead 71 to or-gate 27 approximately immediately after receipt of a pulse through lead 61(0). If the digit stored in the addend entry circuit is one, then a pulse is transmitted through lead 71 approximately immediately following receipt of a pulse through lead 61(1), and so forth. Thus, in the case of addition, the pulse transmitted through lead 71 is delayed relatives to the pulse transmitted through lead 52 by a member of time-units corresponding to the digit stored in the memory provisions of addend entry circuit 70. In the case of subtraction, the delay in time-units is equal to the difference between nine (one less than the radix) and the stored subtrahend digit. Upon receipt of a pulse through either of the leads 51 or 71, or-gate 27 transmits a pulse through lead 28 to sum decoder circuit 80.

From the foregoing description it will be seen that the pulse transmitted through lead 28 is delayed, relative to the pulse supplied through lead 26 by the pulse generator, by an amount equal to the sum of several delays: a first delay of a number of time-units equal to the digit stored in augend entry circuit 40; and a second delay of two time-units in circuit 50 if there is a carry digit to be added; or, if there is no carry digit to be added, a second delay of one time-unit in circuit 50 and a third delay of a number of time-units equal either (in the case of addition) to the digit stored in addend entry circuit 70 or (in the case of subtraction) to nine minus the digit stored in addend entry circuit 70. Two points will be noted: carry digits and addend digits are added in separate operating cycles; in each cycle, the total delay is one time-unit larger than the required sum of the digits to be added, or difference between the digits to be subtracted. Hence, if the required sum or difference is zero, the leading edge of the pulse transmitted through lead 28 will be coincident with the pulse transmitted through lead 32(0)—in this case, decoder circuit 80 will transmit a pulse through lead 81(0) to the transfer circuit 90. If the required sum or difference is one, the leading edge of the pulse through lead 28 will be coincident with the pulse through lead 32(1), and the sum decoder circuit will transmit a pulse through lead 81(1) to transfer circuit 90. In this way, decoder circuit 80 transmits a pulse through the proper one of ten (equal to the radix) leads 81(0-9) to transfer circuit 90 responsive to every pulse received through lead 28 having a time position representing a sum or difference number smaller than ten (the radix selected).

If the sum or difference is ten or more, the sum decoder circuit 80 supplies a carry pulse to the next stage through lead 21, and also supplies, through the proper one of leads 81(0-9), a pulse representing the new subtotal digit to be accumulated in augend entry circuit 40, i.e., the sum or difference number minus the radix ten. Circuitry whereby this may be accomplished is illustrated in FIGS. 8A and 8B, hereinafter described.

As is more fully explained hereinafter, transfer circuit 90 has memory provisions for storing any one of the ten digits zero to nine. Pulses supplied from the augend entry circuit 40 through lead 41 act to clear the previously stored digit from transfer circuit 90. Pulses through any one of the ten leads 81(0-9) from sum decoder circuit 80 act to store a new digit in transfer circuit 90. There is always at least one unit of delay between the occurrence of a pulse on lead 41 and a pulse on any of the leads 81(8-9). Therefore, there can be no interference between the initiation of a clearing operation and an entry operation. If the clearing operation has not been completed before the entry pulse is received over a lead 81(0-9), this is of no consequence, because following operating cycles (each initiated by a pulse from generator 25) will cause repeated pulses through the same one of the leads 81(0-9) until the sum digit is actually entered into the transfer circuit 90.

Once the new digit has been entered in transfer circuit 90, a pulse is supplied through the three branches of lead 92 to the augend entry circuit 40, the carry entry circuit 50, and the addend entry circuit 70. This pulse clears the previous subtotal digit from the memory provisions of augend entry circuit 40. If the addition of a carry has been accomplished, the pulse through lead 92 clears the stored carry digit from the memory provisions of carry entry circuit 50, so that the digit, if any, stored in addend entry circuit 70 can be added to, or subtracted from, the accumulated subtotal in the next operating cycle. If the digit stored in addend entry circuit 70 has been added to the subtotal, then the pulse supplied through lead 92, signifying entry of the new subtotal digit into transfer circuit 90, clears the memory provisions of the addend entry circuit so that it may accept the next digit to be added or subtracted.

While a digit is stored in the memory provisions of transfer circuit 90, an electric signal is supplied continuously through the proper one of ten (equal to the radix) leads 91(0-9) to the augend entry circuit 40. It will be noted, as the description proceeds, that the augend entry circuit can not supply another pulse through lead 41 until the new subtotal digit has been successfully entered. After the new subtotal is entered in circuit 40, the next operating cycle will provide a pulse through lead 41 which will clear the memory provisions of transfer circuit 90.

The adder described can operate with extreme rapidity—a complete five-digit addition or subtraction may take only a few microsseconds. Hence, the time between receipt of an addend or subtrahend digit through leads 20(0-9) and entry of the new subtotal digit in augend entry circuit 40 is practically negligible. The new subtotal digit remains stored in augend entry circuit 40 until receipt of a further entry for addition or subtraction. Hence, except for practically negligible intervals following the receipt of each new entry, the latest accumulated subtotal digit is continuously stored in augend entry circuit 40. The identity of this stored subtotal digit is indicated by an electric signal supplied through the proper one of ten leads 42(0-9) to a readout circuit 100.

Referring to FIG. 3, the ninteen-unit delay circuit 30 comprises a delay line 33 provided with twenty equally spaced terminals: two end terminals and eighteen taps. Lead 26 connects to one of the end terminals for supplying pulses from generator 25 into one end of the delay line 33. The other end terminal of the delay line is connected to a resistor 34, which terminates the delay line in its characteristic impedance, so that pulses reaching the far end of the delay line will be mostly absorbed and not reflected. The delay line is so constructed that the time required for a pulse to travel the entire length of the delay line is exactly nineteen of the chosen time-units, while the interval between the appearance of this pulse at one terminal of the line and its appearance at the next following terminal is exactly one time-unit.

Lead 31(0) is connected to the input end terminal of the delay line; thus, a pulse is transmitted through lead 31(0) to the augend entry circuit almost immediately following the receipt of each pulse from the pulse generator through lead 26. Leads 31(1-9) are connected as shown, in numerical order, to the first nine taps of the delay line, so that a pulse is transmitted through lead 31(1) after a delay of one time-unit, a pulse is transmitted through lead 31(2) after a delay of two time-units, etc. Leads 32(0-17) are connected as shown, in numerical order, to the eighteen taps of delay line 33, and lead 32(18) is connected to the end terminal of the delay line opposite the input end. Thus, responsive to each pulse supplied through lead 26, a pulse is transmitted through lead 32(0) after a delay of one time-unit, a pulse is transmitted through lead 32(1) after a delay of two time-units, etc. The pulse transmitted through lead 32(18) has the maximum time delay of nineteen time-units.

Figure 4:
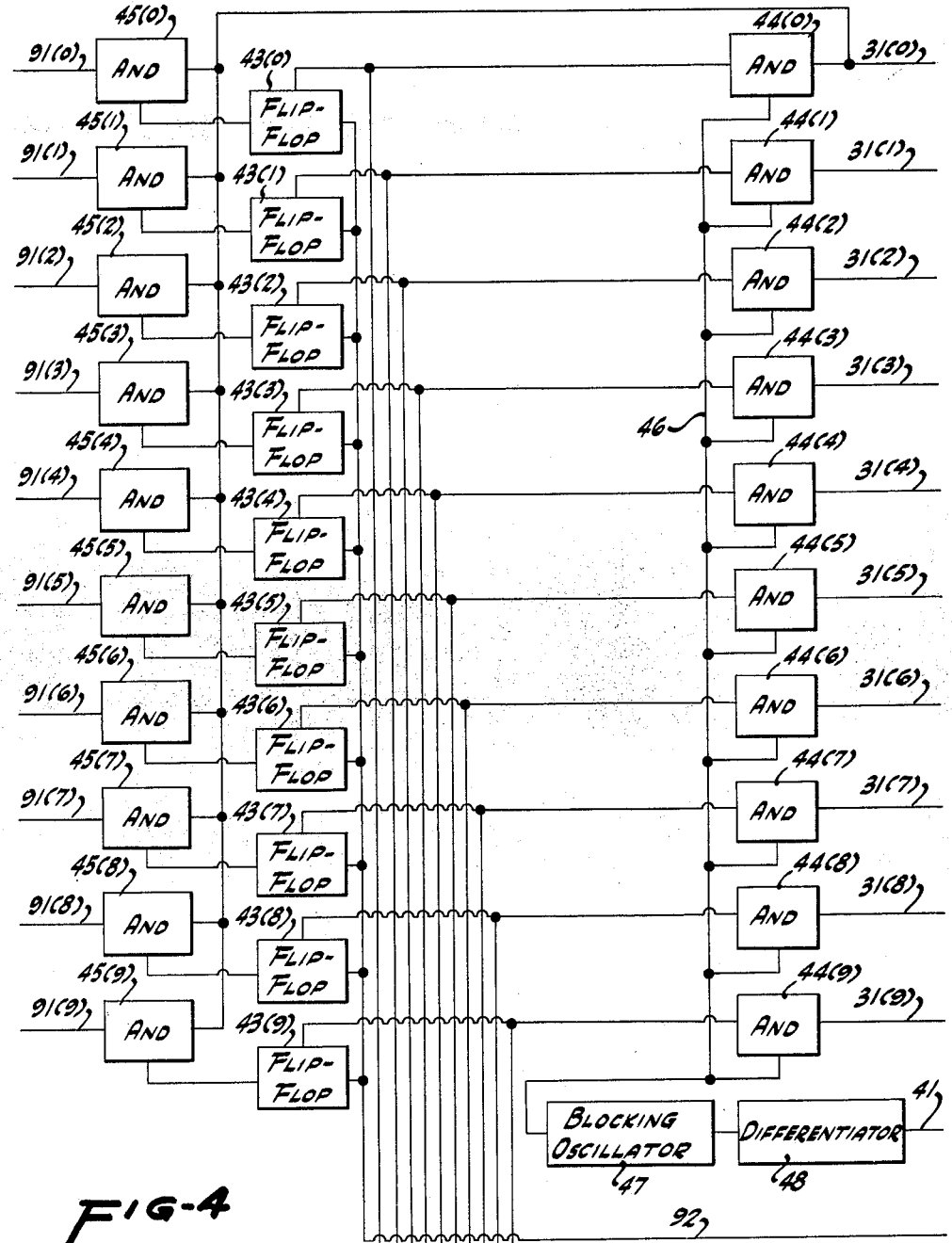
FIG. 4 is a schematic block and circuit diagram of the augend entry circuit 40 of FIG. 2.

The augend entry circuit 40 is shown in FIG. 4. As hereinbefore explained, delay circuit 30 supplies a pulse through each of the leads 31(0-9) at one time-unit intervals during each operating cycle initiated by a pulse from generator 25. The memory provisions of the augend entry circuit consists of ten flip-flops 43(0-9), one for each of the ten digits zero to nine of the chosen number system. Connected between these flip-flops and the ten leads 31(0-9) are ten and-gates 44(0-9), arranged as shown. Each and-gate has one input lead connected to one of the leads 31(0-9), another input lead connected to an output lead of the corresponding one of the flip-flops 43(0-9), and an output lead connected, in common with the output leads of the other nine and-gates 44, to the input of a blocking oscillator 47. So long as a digit is stored in any one of the flip-flops 43(0-9), that flip-flop transmits a signal to one input lead of the corresponding one of the and-gates 44(0-9), and, when a pulse is received through the corresponding one of leads 31(0-9), the selected and-gate transmits a pulse through its output lead to trigger blocking oscillator 47.. .The blocking oscillator generates a pulse having a duration of at least ten time-units. Thus, under no circumstances can oscillator 47 be triggered more than once during a single operating cycle. Differentiating circuit 48 forms a relatively short pulse, having a duration no greater than one time-unit, at the leading edge of the longer pulse generated by the blocking oscillator. The short pulse is transmitted through lead 41 to the carry entry circuit 50 and the transfer circuit 90.

And-gates connected to flip-flops in which no digit is stored do not transmit pulses to their output leads; hence, if there is no digit stored in the flip-flops 43(0-9), no pulse will be transmitted through lead 41 to the carry entry circuit and the transfer circuit. If a single digit is stored in the flip-flops 43(0-9), a single pulse in each operating cycle will be transmitted from the corresponding one of the leads 31(0-9) through the corresponding and-gate 44(0-9) to blocking oscillator 47, which will operate to send a pulse through differentiating circuit 48 to lead 41. Thus, there is provided at lead 41 a pulse having a time position, relative to the initiating pulse supplied through lead 26, that is representative of the digit stored in augend entry circuit 40. In the embodiment illustrated, this time position corresponds to a delay of a number of time-units equal to the stored augend digit. If two digits should inadvertently become stored in flip-flops 43(0-9) concurrently, two pulses would be transmitted to oscillator 47, but only the first would trigger the blocking oscillator. Thus, no more than one pulse per cycle (of effective polarity to operate following components) will be transmitted through lead 41 under any circumstances.

Reset terminals of the ten flip-flops 43(0-9) are connected in parallel to lead 92, so that all flip-flops are reset—i.e., triggered to the state which cuts off all ten of the and-gates 44(0-9)—whenever a pulse is received through lead 92 from the transfer circuit 90. Thus, the previously stored digit is immediately cleared from the memory of the augend entry circuit upon entry of a new subtotal digit in transfer circuit 90.

While the new subtotal digit is stored in transfer circuit 90, an electric signal is supplied continuously through the corresponding one of leads 91(0-9). The ten leads 9-(0-9) are connected to input leads of ten and-gates 45(0-9). Each of the last mentioned and-gates has a second input lead connected to the lead 31(0), so that a pulse is supplied to the second input lead of and-gates 45(0-9) at the beginning of each operating cycle initiated by a pulse from generator 25. Whenever a digit is stored in transfer circuit 90, one of the and-gates 45(0-9) will receive signals at both its inputs when the pulse arrives from lead 31(0), and at this instant will transmit a pulse through its output lead to an input terminal of the proper one of flip-flops 43(0-9) to store the new subtotal digit in the memory of the augend entry circuit. As has already been noted, no pulse will be transmitted through lead 41 until the new subtotal digit is successfully stored in one of the flip-flops 43(0-9), and transfer circuit 90 continues to supply a signal through the appropriate one of leads 91(0-9) until the transfer circuit is reset by the receipt of a pulse through lead 41. Thus, operation is completely reliable, whether entry of the new digit into the augend entry circuit is completed in one operating cycle or not.

The ten leads 42(0-9) are connected to the outputs of the ten flip-flops 43(0-9), so that an output signal is supplied substantially continuously to readout circuit 100 through the lead 42(0-9) that corresponds to the digit stored in the augend entry circuit.

The carry entry circuit 50 is so arranged that a carry digit will be added to the accumulated subtotal digit whenever an electric pulse representing a carry has been received from the preceding stage through lead 22. In the illustrated embodiment, the addition of carry digits takes precedence over addition of digits received through leads 20(0-9), the carry digit, if any, being added in one operating cycle, and the digit stored in circuit 70 being added or subtracted in a following operating cycle.

Figure 5:
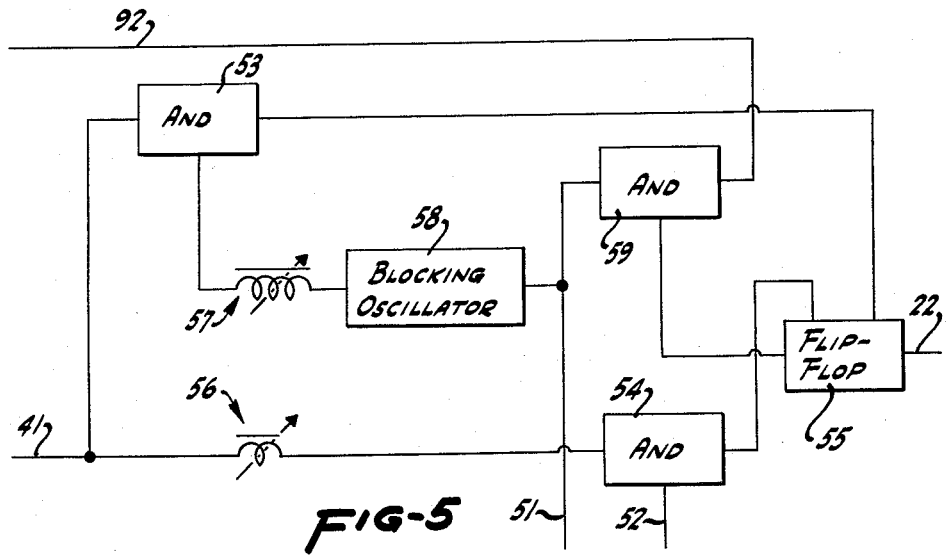
FIG. 5 is a schematic block and circuit diagram of the carry entry circuit 50 of FIG. 2.

Referring to FIG. 5, illustrating the carry entry circuit, lead 41 is connected to two branch circuits, containing and-gates 53 and 54 controlled by a flip-flop 55 so that pulses received through lead 44 will be transmitted through only one of the two and-gates 53 and 54. Lead 22 is connected to one input of flip-flop 55, which acts as a memory for storing the carry digits received from the preceding stage. Input leads of gates 53 and 54 are connected to opposite outputs of flip-flop 55, as indicated in the drawing in such a manner that gate 53 will transmit pulses from lead 41 only when a carry digit is stored in flip-flop 55 and gate 54 will transmit pulses from lead 41 only when no carry digit is stored in flip-flop 55. The other input lead of gate 53 is connected directly to lead 41 and the other input lead of gate 54 is connected to lead 41 through a preferably adjustable, approximately one time-unit delay circuit 56. The output of gate 54 is connected to lead 52 for supplying pulses to the nine-unit delay circuit 60 when there is no carry digit to be added. Delay line 56 supplies the approximately one unit of delay required for the pulse through lead 28 to reach sum decoder circuit 80 simultaneously with the pulse through lead 32(0), when both augend and addend digits are zero. Delay unit 56 is preferably made adjustable to permit compensation for any differences between the unavoidable delays encountered elsewhere in the circuits, so that precise time coincidence of the proper pulses can be obtained at the sum decoder circuit.

When there is a carry digit stored in flip-flop 55, and-gate 54 will not transmit pulses, but and-gate 53 will transmit pulses from lead 41 through a preferably adjustable, approximately two time-unit delay line 57 to the input of a blocking oscillator 58. This pulse triggers the blocking oscillator, whereupon the blocking oscillator supplies a pulse of extended duration—preferably greater than ten time-units—through lead 51 to or-circuit 27. The leading edge of the pulse thus supplied through lead 28 to the sum decoder circuit will arrive two time-units later than the pulse through lead 41, and will be coincident with the proper one of the train of pulses supplied through leads 32(0-18) to increase the stored subtotal digit by one. In other words, when the previously accumulated subtotal digit stored in circuit 40 is zero, and a carry digit is entered in circuit 50, the leading edge of the pulse supplied through lead 28 will be coincident with the pulse supplied to the sum decoder circuit through lead 32(1), the sum decoder circuit will supply a pulse through lead 81(1) to transfer circuit 90, and a signal through lead 91(1) will enter the digit one in circuit 40, thereby increasing the stored augend digit by one, and effectively adding in the desired carry digit. The extended duration of the pulse supplied by blocking oscillator 58 allows it to control the gating of reset pulses, as hereinafter explained, and also insures that lead 28 thus remains energized for a sufficiently long time to rule out the possibility of any subsequent inadvertent pulse creating a double coincidence at the sume decoder circuit during a single operating cycle.

After successful entry of the new sum digit in the memory of the transfer circuit 90, a pulse is transmitted through lead 92 to one input lead of an and-gate 59 in the carry entry circuit. The other input lead of and-gate 59 is connected to the output of the blocking oscillator 58, and the output lead of and-gate 59 is connected to the reset terminal of flip-flop 55. Thus, once the carry digit stored in flip-flop 55 has been added to the subtotal digit, and the new subtotal digit stored in transfer circuit 90, flip-flop 55 is cleared to prevent re-addition of the same carry digit in a succeeding operating cycle. On the other hand, receipt of a pulse through lead 92 responsive to the addition of a digit from addend entry circuit 70 will not reset flip-flop 55, because in this case blocking oscillator 58 will not have operated, and there will be no input to the second lead of and-gate 59.

Reliable operation is assured by the arrangement which makes it impossible for a pulse to be transmitted through both leads 51 and 52 during the same operating cycle, irrespective of the time of arrival of a carry signal at flip-flop 55. If a carry is already stored in flip-flop 55 when a pulse reaches and-gate 53 through lead 41, then no pulse can be transmitted through and-gate 54 to lead 52 until this carry has been cleared from the flip-flop 55, because delay line 56 insures that the arrival of a pulse at and-gate 54 is approximately one time-unit later than the arrival of the same pulse at and-gate 53. Because of the two-unit delay in delay line 57, reset pulses received through line 92, to clear flip-flop 55, always arrive at least one time-unit later than the arrival of a pulse in the same operating cycle at the left input line of and-gate 54. Hence, under no circumstances will and-gate 54 transmit a pulse to line 52 during the same operating cycle that a pulse is transmitted through and-gate 53. Under some circumstances a pulse arriving through lead 41 may be transmitted to neither of the lines 51 and 52. This can happen, for example, if a signal arriving through lead 22 enters a carry in flip-flop 55 an instant too late for a pulse from lead 41 to be transmitted through and-gate 53, but before the pulse from lead 41 has arrived at and-gate 54. However, this causes no difficulty except the loss of one operating cycle. The next pulse arriving through lead 41 will be transmitted by and-gate 53, and the carry will be added to the previous subtotal digit.

It is to be noted that the operating speed of flip-flop 55 does not impose a substantial limitation upon the adding speed of the circuit. The time lag between the arrival of a carry order through lead 22 and the change of state of flip-flop 55 is immaterial. If the flip-flop has not changed state by the time a pulse from lead 41 reaches and-gate 54, this pulse will be transmitted through lead 52, so that the addend digit stored in circuit 70 can be added to the subtotal digit. When flip-flop 55 does change state, the next pulse through lead 41 will be transmitted by and-gate 53, and the carry will be added to the subtotal digit. However, when the carry has been added, and a reset signal arrives through lead 92, flip-flop 55 must reset before the next pulse arrives through lead 41, in order to insure that the same carry will not be added in twice. This is not a serious limitation upon operating speed, because seven or more time-units will always be available for this reset operation.

Figure 6:
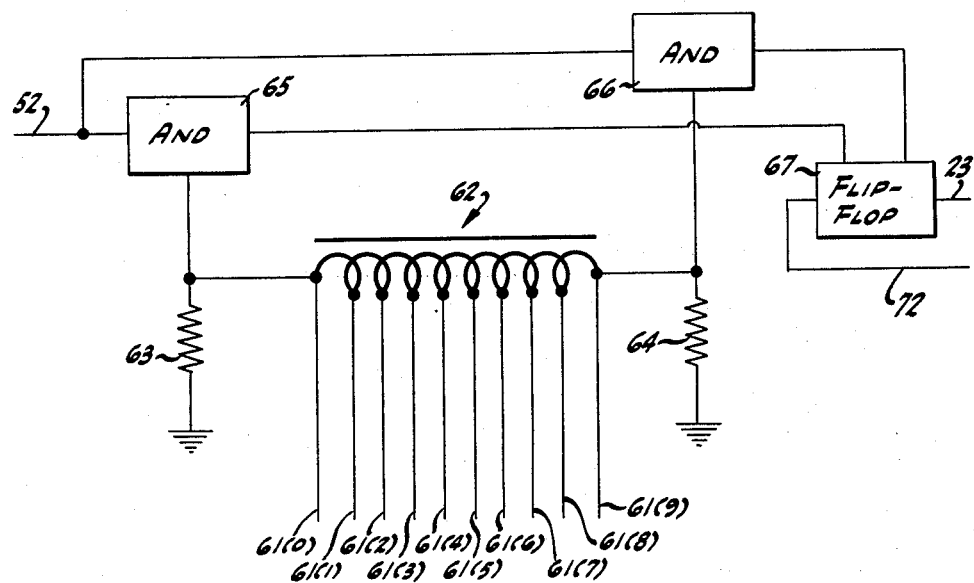
FIG. 6 is a schematic block and circuit diagram of the nine-unit delay circuit 60 of FIG. 2.

Referring now to FIG. 6, the nine-unit delay circuit 60 comprises a delay line 62 having two end terminals and eight taps, equally spaced along its length. This delay line is so designated that the time required for a pulse to travel along the line from one of its terminals to the next is exactly equal to one time-unit; thus, the total delay of a pulse traveling from one end to the other of line 62 is nine time-units. These are the same time-units, all equal to one another, described in connection with the nineteen-unit delay circuit 30. Resistors 63 and 64 are connected to the end terminals of delay line 62 and terminate both ends of this delay line in their characteristic impedance, so that there are no substantial reflections of pulses traveling in either direction through the delay line. The ten leads 61(0–9) are connected in numerical order to successive terminals of delay line 62, beginning at one end of the line. The two input terminals of delay line 62 are connected to the output leads of two and-gates 65 and 66, the and-gate 65 being connected to the same end terminal as lead 61(0), and the and-gate 66 being connected to the same end terminal as lead 61(9). Lead 52 from circuit 50 is connected to one input lead of each and-gate. The other input leads of and-gates 65 and 66 are connected to a flip-flop 67 having one input lead connected to lead 23 for receiving subtract order signals, and having another input lead connected to lead 72, which transmits reset signals from the addend entry circuit, as hereinafter explained. Only one of the and-gates 65 and 66 transmits pulses received from lead 52 at any given time, depending upon the state of flip-flop 67. If a subtract order has not been stored in flip-flop 67, each pulse received through lead 52 is transmitted through and-gate 65 to the left end of delay line 62, whereupon a pulse appears almost immediately at lead 61(0), a pulse appears at lead 61(1) after a delay of one time-unit, a pulse appears at lead 61(2) after a delay of two time-units, etc. On the other hand, if a subtract order has been stored in flip-flop 67, each pulse received through lead 52 is transmitted by and-gate 66 to the right end of delay line 62, whereupon a pulse appears at lead 61(9) almost immediately, a pulse appears at lead 61(8) after a delay of one time-unit, a pulse appears at lead 61(7) after a delay of two time-units, etc.

After the substraction of a subtrahend digit has been completed, a reset pulse is transmitted through lead 72, which resets flip-flop 67, and thus clears the previously stored subtract order.

Figure 7:
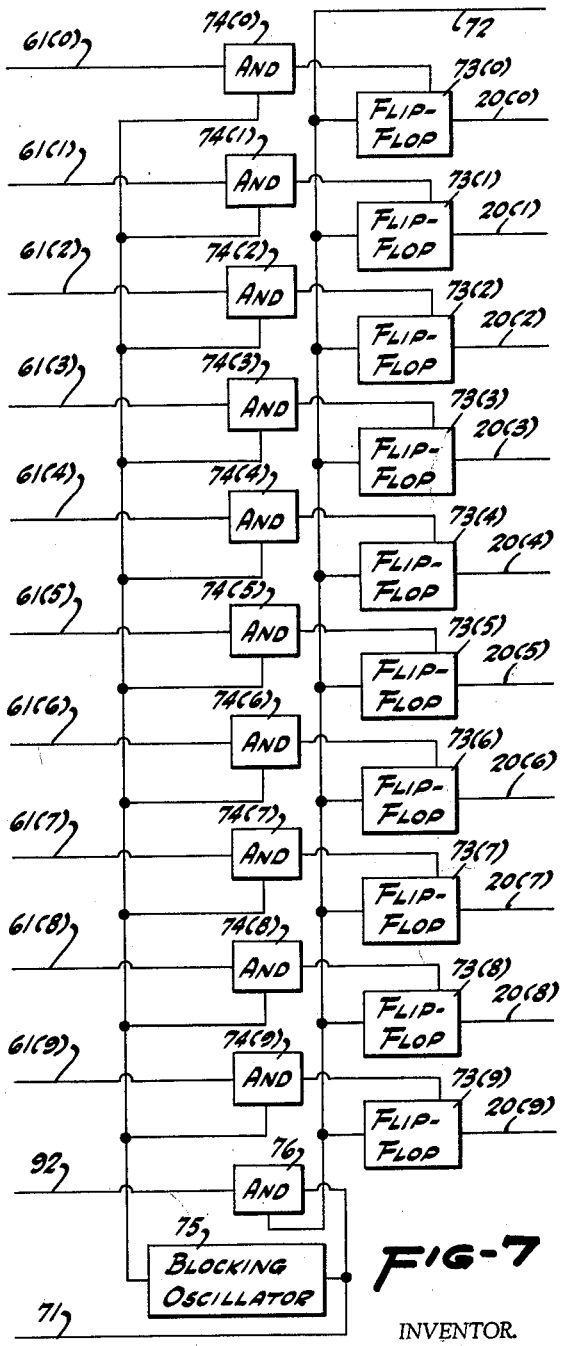
FIG. 7 is a schematic block and circuit diagram of the addend entry circuit 70 of FIG. 2.

Referring to FIG. 7, addend (or subtrahend) digits to be added (or subtracted) are entered through the ten leads 20(0–9) connected to input leads of ten flip-flops 73(0–9). In other words, a zero which is to be added or subtracted is stored in flip-flop 73(0), a one which is to be added or subtracted is stored in flip-flop 73(1), etc. Ten and-gates 74(0–9) each have two input leads, one of which is connected to an output lead of a corresponding one of flip-flops 73(0–9), and the other of which is connected to the corresponding one of leads 61(0–9) from nine-unit delay circuit 60. The output leads of and-circuits 74(0–9) are connected in common to the input of a blocking oscillator 75.

If a digit has been stored in one of the flip-flops 73(0–9), the corresponding and-gate will transmit a pulse from the corresponding one of leads 61(0–9) to trigger blocking oscillator 75. If no subtract order has been stored in the memory provisions (flip-flop 67) of the nine-unit delay circuit 60, then the delay between the transmission of a pulse through lead 52 to the nine-unit delay circuit and the transmission of a triggering pulse to blocking oscillator 75 will be a number of time-units equal to the addend digit stored in flip-flops 73(0–9). Blocking oscillator 75 is thereupon operated to supply a pulse through lead 71 with a leading edge having a time position relative to the pulse in lead 52 that is representative of the addend digit which is to be added to the previously stored augend or subtotal digit. It will be remembered that the time position of the pulse through lead 52 is representative of the value of the augend digit, and hence the time position of the leading edge of the pulse provided in lead 71, relative to the pulse supplied through lead 26 by pulse generator 25, is representative of the sum of the augend and addend digits. In fact, the total delay between the pulse supplied by generator 25 and the leading edge of the pulse supplied through lead 71 by blocking oscillator 75, expressed in the chosen time-units, is one greater than the sum of the augend and addend digits.

The output of blocking oscillator 75 is also connected to one input lead of and-gate 76. The other input lead of and-gate 76 is connected to lead 92 for receiving reset pulses upon the successful entry of a new subtotal digit in transfer circuit 90. The duration of the pulses supplied by blocking oscillator 75 is sufficient that the output pulse of the blocking oscillator is still present at one input lead of and-gate 76 when the reset pulse of the same operating cycle arrives through lead 92. Thus, whenever blocking oscillator 75 has been operated during a particular operating cycle, and the new sum digit has been successfully entered in the transfer circuit 90, a reset pulse from lead 92 is transmitted through and-gate 76 to reset input leads of the ten flip-flops 73(0-9), for resetting these flip-flops, to clear the stored addend or subtrahend digit. The reset pulse is also transmitted through lead 72 to the reset lead of flip-flop 67 in circuit 60 to clear therefrom the subtract order, if any, stored therein. As further assurance that no more than one pulse per operating cycle will be supplied through lead 71 by the addend entry circuit, the pulses provided by blocking oscillator 75 should have a duration of at least ten time-units. Thus, even if pulses should be transmitted through more than one of the and-gates 74(0-9), blocking oscillator 75 can not operate more than once in the same cycle.

If a subtrahend digit has been stored in the flip-flops 73(0-9), and concurrently or previously a subtract order was entered in flip-flop 67 of circuit 60, the operation will be exactly the same, except that the pulses transmitted through leads 61(0-9) will be in inverse order to the lead numbers, and the time delay between the pulses transmitted through lead 52 and the leading edge of the pulses transmitted through lead 71 from blocking oscillator 75, measured in time-units, will be equal to nine minus the subtrahend digit. Thus, taking into account the carry entered into the hundredths register and the nine entered into the thousands register concurrently with the entry of a subtract ordr, subtraction is achieved by the addition of the complement of the subtrahend.

For highest reliability, entry of the subtract order through lead 23 should precede entry of the subtrahend digit through leads 20(0-9) slightly, to make sure that the subtrahend digit can in no circumstances be added before the subtract order is entered. With this precaution, the speed of operation of the flip-flops does not substantially limit the speed of addition and subtraction, and the entry of digits to be added and subtracted need not be synchronized with the operation of the adder. If the digit has not been added in the appropriate flip-flop 73(0-9) in time for one operating cycle, it will simply be added in a subsequent operating cycle. There is almost no possibility of error.

The description thus far has explained in detail how a pulse is transmitted through lead 51 to or-circuit 27, if there is a carry from a preceding stage to be added to the previously accumulated subtotal digit, and how a pulse is supplied through lead 71 to or-circuit 27 if there is no carry to be added but there is an addend or subtrahend digit to be added or subtracted stored in the memory provisions of addend entry circuit 70. In either case, the pulse is transmitted by or-circuit 27 through lead 28 to sum decoder circuit 80.

Referring to FIGS. 8A and 8B together, pulses received through lead 28 pass through a differentiating circuit 83, which supplies a relatively short pulse, having a duration less than one time-unit, to lead 84 coincident with the leading edge of the pulse received from lead 28. The pulse thus supplied to lead 84 will be coincident in time with one of the train of pulses supplied through leads 32(0-18) by the nineteen-unit delay circuit. In fact, the time position of the pulse in lead 84 is such that this pulse is coincident with that one of the train of pulses supplied through leads 32(0-18) that represents the sum of the previously accumulated subtotal or augend digit and either a carry of one, in case a carry has been entered by circuit 50, or the addend digit, in case a digit to be added has been entered by circuit 70, or nine minus the subtrahend digit, in case a digit to be subtracted has been entered by circuit 70. In particular, if the required sum is zero, the pulse in lead 84 will be coincident in time with the pulse in lead 32(0); if the required sum is one, the pulse in lead 84 will be coincident in time with the pulse in lead 32(1), etc. The largest sum possible occurs when an addend digit nine is added to an augend digit nine, in which case the sum is eighteen, and the pulse in lead 84 is coincident in time with the pulse in lead 32(18).

Nineteen and-gates 85(0-18) have input leads connected to the leads 32(0-18) and other input leads connected in common to lead 84, as illustrated. The output leads of these nineteen and-gates are identified by reference numbers 86(0-18). The function of gates 85(0-18) is to detect the existence of coincidence between the pulse on lead 84 and any one of the pulses supplied through leads 32(0-18) successively. Hence, gates 85(0-18) are coincidence gates, and when coincidence occurs at any of these gates, a pulse is transmitted to the corresponding one of the leads 86(0-18). With this arrangement, each time that a pulse appears at lead 84 having a time position indicative of a desired sum, the pulse is transmitted through the proper and-gate to provide a pulse at the correspondingly numbered one of leads 86(0-18).

Whenever a pulse occurs in any of the leads 86(10-18), a carry signal should be transmitted to the next following stage; for this purpose, there is provided an or-gate 87 having nine input leads connected to the nine leads 86(10-18), and an output lead 21 which connects to the carry entry lead of the next stage.

Whenever the sum number is between zero and nine, that number must be transmitted to transfer circuit 90 to be entered in the augend entry circuit as the new subtotal digit. When the sum is between ten and eighteen, the number transmitted to the transfer circuit must be ten less than the sum number. This is accomplished by providing nine or-gates 88(0-8) having first input leads connected to leads 86(0-8), and second input leads connected to leads 86(10-18), as illustrated. Leads 81(0-8) are the output leads of these nine or-gates. Lead 81(9) is connected directly to lead 86(9), no or-gate being required in this instance, because there is no lead 86(19). Thus, in every case, an electric pulse is transmitted through the proper one of the nine leads 81(0-9) representing the correct new subtotal digit that is to be entered into the augend entry circuit.

Referring now to FIG. 9, lead 81(0) is connected to one input lead of an or-gate 93 having input lead connected to reset order entry lead 24, and having an output lead connected to one input of flip-flop 94(0). Thus, flip-flop 94(0) is set to store the digit zero whenever a pulse is transmitted either through lead 81(0) or through lead 24. Leads 81(1-9) are connected to inputs of flip-flops 94(1-9). Thus the ten flip-flops 94(0-9) of the transfer circuit store, in all cases, the proper one of the ten digits zero to nine required to be entered into the augend entry circuit as a new subtotal digit. The proper one of the output leads 91(0-9) continuously transmits an electric signal to the augend entry circuit so long as a digit remains stored in any one of the flip-flops 94(0-9).

Or-circuit 95 has ten input leads connected to the ten leads 91(0-9), and has an output lead connected to trigger a blocking oscillator 96. Thus, whenever any one of the ten flip-flops 94(0-9) is set to store a digit, by the receipt of a pulse through lead 24 or one of the leads 81(0-9), blocking oscillator 96 is triggered, and transmits a reset pulse through lead 92 for clearing the previously stored digit from the memory provisions of augend entry circuit 40, and for clearing either the stored carry from circuit 50 or the stored digit from circuit 70, as hereinbefore explained.

It is again noted that the operating speed of the flip-flops is not a material limitation upon the speed of addition or subtraction. The circuits of FIGS. 8A and 8B consist solely of and-gates and or-gates, which can be made up entirely of high-speed diodes, as is well known. The flip-flops shown in FIG. 9 are not required to operate with exceptional speed. Pulses representing the required sum will continue to be supplied through leads 81(0–9) repeatedly, one in each operating cycle, until this sum is successfully entered in the flip-flops used for the memory provisions of transfer circuit 90. When the sum digit is thus entered, a reset pulse will clear the carry, addend, or subtrahend digit.

As has already been explained, the accumulated subtotal digit is represented substantially continuously by an electric signal appearing in the proper one of leads 42(0–9). This signal can actuate any desired type of readout apparatus. In case nothing more than a visual readout is needed, the readout apparatus can consist merely of ten neon lamps 101(0–9), illustrated in FIG. 10. These neon lamps have first electrodes connected to the leads 42(0–9), and second electrodes connected in common to a voltage supply of such voltage that the only lamp to be lighted is the one connected to that one of leads 42(0–9) presently receiving a signal from circuit 40.

An alternative adder stage is shown in FIG. 11. In this figure, parts that are identical to parts already described in this specification have been given the same reference numbers for clarity. Pulse generator 25 periodically supplies pulses through lead 110 to a nine-unit delay line 111, provided with ten terminals at which pulses appear successively, at intervals of one time-unit. Leads 112(0–9) are connected to these ten terminals in inverse order to the order in which pulses appear, i.e., lead 112(9) is connected to the input end terminal which receives a pulse almost immediately following transmission of a pulse through lead 110, lead 112(8) is connected to the terminal that receives a pulse one time-unit later, etc., lead 112(0) being connected to the end terminal that receives a pulse after a delay of nine time-units. Leads 112(0–9) are connected to an augend entry circuit 120, illustrated in FIG. 12, and more fully described hereinafter. Following the transmission of each pulse through lead 110 by a delay expressed in time-units equal to nine minus the stored augend digit, a pulse is transmitted through lead 26 to nineteen-unit delay circuit 30. Circuit 30 is connected through nineteen leads 32(0–18) to sum decoder circuit 80 in the manner hereinbefore described. An essential difference between the arrangement shown in FIG. 11 and the arrangement shown in FIG. 2 is this: with the FIG. 2 arrangement, the pulse transmitted through lead 32(0) follows the initiating pulse supplied by generator 25 with a fixed delay of one time-unit, whereas in the arrangement shown in FIG. 11, the pulse transmitted through lead 32(0) follows the initiating pulse supplied by generator 25 with a delay expressed in time-units of ten minus the digit stored in the memory provisions of the augend entry circuit. In both cases, the pulses through lead 32(1–18) follow the pulses through lead 32(0) in succession at one time-unit intervals.

Lead 113 is connected to the same end terminal of delay line 111 as lead 112(0), and thereby transmits a pulse to amplifier 114 nine time-units after the generation of an initiating pulse by generator 25. The delayed pulse is amplified by amplifier 114 and transmitted through lead 41 to carry entry circuit 50, which is connected to or-circuit 27 and delay circuit 60, and through these circuits to addend entry circuit 70 and sum decoder circuit 80, in the same manner as hereinbefore explained in connection with the arrangement illustrated in FIG. 2. If there is a carry to be entered, the arrangement shown in FIG. 11 supplies a pulse through lead 28 eleven time-units after the initiating pulse supplied by generator 25. The pulse supplied through lead 32(0) follows the pulse generated by generator 25 with a delay in time-units equal to ten minus the stored augend digit. Thus, it is evident that the leading edge of the pulse supplied by lead 28 will be coincident with the pulse in that one of the leads 32(0–18) identified by the reference number in parentheses that is one greater than the previously accumulated subtotal or augend digit. From the preceding description of the sum decoder circuit, it will be apparent that this time relation will provide electric signals through the proper one of leads 81(0–9), together with a signal through lead 21 if there is to be a carry, for correctly adding the carry from the preceding stage to the previously accumulated subtotal digit. By adding up the time delay in each case, it will be seen that digits entered into circuit 70 through leads 20(0–9) are also added correctly, or subtracted correctly in case a subtract order entry is also provided through lead 23.

In the arrangement of FIG. 11, leads 81(0–9) transmit pulses from the decoder circuit 80 directly to the augend entry circuit 120. When the new subtotal digit is successfully entered into the augend entry circuit, a pulse is provided through the proper one of leads 121(0–9) to a printer 115, which prints the new subtotal upon a tape, or performs any other desired record-making or further operation. Visual readout may be provided within circuit 120 itself, as hereinafter explained. Leads 121(0–9) are also connected to ten input leads of an or-circuit 116, which transmits a clear pulse through the two branches of lead 92 to circuits 50 and 70 upon the successful entry of a new augend digit in circuit 120.

Referring now to FIG. 12, augend digits are stored in ten neon lamps 122(0–9) arranged in a circuit such that only one lamp is lit at a time. The ten neon lamps are connected in series with ten diodes 123(0–9), ten load resistors 124(0–9), and a constant-current supply 125, in the manner illustrated. The constant current supply provides a sufficient current to keep one, and generally only one, of the neon lamps 122(0–9) lit. Thus, the neon lamps serve both as a memory provision and as a visual indicator of the stored augend digit. Ten and-gates 126(0–9) have first input leads connected to the ten neon lamps 122(0–9), these leads being connected between each lamp and its load resistor so that an input is supplied to the and-gate associated with the neon lamp that is lit. Leads 112(0–9) connect to the other inputs of the ten and-gates. The outputs of and-gates 126(0–9) are connected in common to trigger a blocking oscillator 127; thus, the neon lamp that is lit, representing a particular digit stored in the augend entry circuit, determines the time delay between the initiating pulse supplied by generator 25 and the triggering of blocking oscillator 127. As hereinbefore explained, this time delay, expressed in the selected time-units, is equal to nine minus the stored augend digit. Preferably, the duration of the pulse generated by blocking oscillator 127 is at least ten time-units, so that the blocking oscillator can be triggered no more than once in an operating cycle, even if two or more of the neon lamps 122(0–9) should inadvertently become lit concurrently. A differentiator 128 supplies a relatively short pulse having a duration less than one time unit to lead 26, concurrent with the leading edge of the pulse generated by the blocking oscillator 127.

Leads 81(0–9) from circuit 80 are connected to trigger ten blocking oscillators 129(0–9). The outputs of these ten blocking oscillators are connected to the ten neon lamps 122(0–9) between the lamp and the diode, as shown. The polarity of the diodes illustrated assumes that the blocking oscillators will supply negative pulses; if the blocking oscillators supplied positive pulses, the polarity of the diodes would be reversed. The polarity of supply 125 is such that current flows in the easy direction through the ten diodes. When any one of the blocking oscillators 129(0–9) is triggered, it generates a pulse that increases the voltage across the corresponding one of the ten neon lamps 122(0–9). This lights that lamp, and the resulting surge of current decreases the voltage across the other lamps, and extinguishes any previously lit lamps. In this way, the proper lamp is lit, and all other lamps are extinguished, whenever any one of the ten blocking oscillators 129(0–9) is triggered to enter a new subtotal digit in the augend entry circuit. It should be noted that the lighting and unlighting of lamps required for entry of a new digit need not be completed in one unit of time. The output pulses of the blocking oscillators may have a duration as long as is required to enter new digits in the neon lamp memory with high reliability.

Output pulses from the blocking oscillators also supply pulses through leads 121(0-9) for operating printer 115, and for sending reset pulses through or-circuit 116 and lead 92 to circuits 50 and 70.

The reset lead 24 is connected as shown to lamp 122(0) through a diode 123(R). Thus, a negative pulse of adequate amplitude and duration supplied through lead 24 will light lamp 122(0) and extinguish all the other lamps, in the same manner as the action of blocking oscillator 129(0).

It will be understood that the invention in its broader aspects is not limited to the specific embodiments illustrated and described, and that various changes and modifications will be apparent to those skilled in the art.

What is claimed is:

1. An arithmetic circuit comprising first memory means for storing a number, second memory means for storing another number, means for entering a plurality of such numbers successively into storage within said memory means, means for producing an electric pulse, means for producing a train of electric pulses, first coincidence means, means connected and arranged to compare the result of an arithmetic operation involving the two stored numbers in said first and second memory means with one of said train of pulses to produce an output pulse having a time position with respect to the first pulse of said train of pulses related to said result, second coincidence means connected and arranged to compare the time position of said output pulse relative to the first pulse of said train of pulses for determining the numerical value of the result, means interconnecting said second coincidence means and said first memory means for automatically changing the number stored within the first memory means to the so-determined value, and means interconnecting said second coincidence means and said second memory means for automatically removing the then-stored number from storage within the second memory means upon the completion of such determination.

2. An adding circuit comprising the combination of first memory means for storing a number, second memory means for storing another number, means for entering a plurality of numbers successively into storage within said memory means, a tapped delay line having an input terminal connected to receive a first pulse and having a plurality of output terminals arranged to provide a train of pulses following one another at fixed time intervals following the receipt of said first pulse, first coincidence means connected and arranged to compare the contents of said first and second memory means with one of said chain of pulses to provide a second electric pulse separated from said first pulse by a time interval determined by the algebraic sum of the two stored numbers, a plurality of coincidence gates each having a first input connection to an output terminal of said delay line and having a second input connection arranged to receive the second pulse, so that a coincidence of pulses occurs at only one coincidence gate determined by the algebraic sum of the stored numbers, means interconnecting said coincidence gates and said first memory means for automatically changing the number stored within the first memory means to equality with the algebraic sum represented by such coincidence of pulses, and means interconnecting said coincidence gates and said second memory means for automatically removing the then-stored number from storage within the second memory means responsive to the occurrence of such coincidence of pulses.

3. An addition-subtraction circuit comprising electrical first memory means for storing a numerical value representing at least a portion of an accumulated subtotal, electrical second memory means for storing a numerical value representing at least a portion of an addend-subtrahend number, parallel input electric leads for entering a plurality of such numerical values successively into said second memory means, electrical third memory means for storing subtract orders, a subtract order input lead for entering such orders into said third memory means, electrical fourth memory means for storing a carry, a carry input lead for entering carries into said fourth memory means, first pulse-producing means for producing an electric plus means connected to said first pulse-producing means for producing a train of electric pulses spaced at equal one-unit time intervals following receipt of said first pulse in response to a pulse from said first pulse-producing means, first coincidence means connected and arranged to compare the contents of said first memory means producing a first output pulse having a time position relative to the beginning of said train of pulses of a time equal to a first variable time less a fixed time, said first variable time being a number of one-unit time intervals equal to the numerical value stored within said first memory means, first delay means providing a fixed delay, second delay means providing a delay one time-unit greater than that provided by said second delay means, a first switching means connected to and controlled by said fourth memory means and arranged to route the first-mentioned pulse through said second delay means or through said first delay means, selectively, depending upon whether or not a carry is stored within said third memory means, fourth delay means including a delay line having delay-line input terminals at its opposite ends, second switching means connected to and controlled by said third memory means and arranged to route pulses from said first delay means to one of said delay line input terminals or the other, selectively depending upon whether or not a subtract order is stored within said third memory means, said third delay means being connected to and controlled by said second memory means and arranged to delay pulses supplied to said one delay-line input terminal when there is a stored subtract order by a number of one-unit time intervals equal to a number one smaller than the radix of the number system employed minus the numerical value stored within said second memory means, and to delay pulses supplied to said other delay-line input terminal when there is no stored subtract order by a number of one-unit time intervals equal to the numerical value stored within said second memory means, a plurality of two-input coincidence gates, one of said inputs of each such gate connected and arranged to receive successively the successive pulses of said train, means for supplying to the other input of all of said coincidence gates simultaneously the delayed pulses transmitted from said second and third delay means, whereby there is a coincidence of pulses at only one coincidence gate representing an algebraic sum having a numerical value equal to the value stored within the first memory means, plus one if there is a carry stored within the fourth memory means, or plus a number one smaller than the radix minus the value stored within the second memory means if there is no stored carry but there is a subtract order stored within the third memory means, or plus the value stored within the second memory means if there is neither a stored carry nor a stored subtract order, means for changing the value stored in the first memory means to a value equal to said sum if said sum is less than the radix of the number system employed, or equal to said sum minus the radix if said sum is not less than the radix, a carry output lead, means for supplying an electric pulse to said carry output lead if said sum is larger than the radix minus one, means for automatically clearing the stored number from said second memory means after the addition of an addend, means for automatically clearing the stored number from said second memory means and the subtract order from said third memory means after subtraction of a subtrahend, and means for automatically clearing the carry from said fourth memory means after the addition of a carry.

4. A multi-stage adder-subtractor comprising a plurality of circuits each comprising; electrical first memory means for storing a numerical value representing at least a portion of an accumulated subtotal, electrical second memory means for storing a numerical value representing at least a portion of an addend-subtrahend number, parallel input electric leads for entering a plurality of such numerical values successively into said second memory means, electrical third memory means for storing subtract orders, a subtract order input lead for entering such orders into said third memory means, electrical fourth memory means for storing a carry, a carry input lead for entering carries into said fourth memory means, first pulse-producing means for producing an electric pulse, means connected to said first pulse-producing means for producing a train of electric pulses spaced at equal one-unit time intervals following receipt of said first pulse in response to a pulse from said first pulse-producing means, first coincidence means connected and arranged to compare the contents of said first memory means producing a first output pulse having a time position relative to the beginning of said train of pulses of a time equal to a first variable time less a fixed time, said first variable time being a number of one-unit time intervals equal to the numerical value stored within said first memory means, first delay means providing a fixed delay, second delay means providing a delay one time-unit greater than that provided by said second delay means, a first switching means connected to and controlled by said fourth memory means and arranged to route the first-mentioned pulses through said second delay means or through said first delay means, selectively, depending upon whether or not a carry is stored within said third memory means, fourth delay means including a delay line having delay-line input terminals at its opposite ends, second switching means connected to and controlled by said third memory means and arranged to route pulses from said first delay means to one of said delay-line input terminals or the other, selectively, depending upon whether or not a subtract order is stored within said third memory means, said third delay means being connected to and controlled by said second memory means and arranged to delay pulses supplied to said one delay-line input terminal when there is a stored subtract order by a number of one-unit time intervals equal to a number one smaller than the radix of the number system employed minus the numerical value stored within said second memory means, and to delay pulses supplied to said other delay-line input terminal when there is no stored subtract order by a number of one-unit time intervals equal to the numerical value stored within said second memory means, a plurality of two-input coincidence gates, one of said inputs of each said gate connected and arranged to receive successively the successive pulses of said train, means for supplying to the other input of all of said coincidence gates simultaneously the delayed pulses transmitted from said second and third delay means, whereby there is a coincidence of pulses at only one coincidence gate representing an algebraic sum having a numerical value equal to the value stored within the first memory means, plus one if there is a carry stored within the fourth memory means, or plus a number one smaller than the radix minus the value stored within the second memory means if there is no stored carry but there is a subtract order stored within the third memory means, or plus the value stored within the second memory means if there is neither a stored carry nor a stored subtract order, means for changing the value stored in the first memory means to a value equal to said sum if said sum is less than the radix of the number system employed, or equal to said sum minus the radix if said sum is not less than the radix, a carry output lead, means for supplying an electric pulse to said carry output lead if said sum is larger than the radix minus one, means for automatically clearing the stored number from said second memory means after the addition of an addend, means for automatically clearing the stored number from said second memory means and the subtract order from said third memory means after subtraction of a subtrahend, and means for automatically clearing the carry from said fourth memory means after the addition of a carry; connections from the carry output lead of each of such circuits except the last to the carry input lead of the next following one of such circuits; and connections for entering carry orders in parallel through the subtract order entry leads of all such circuits except the last, the carry input lead of the first such circuit, and the parallel input electric lead for entering a numerical value one smaller than the radix in the last such circuit.

5. A circuit for adding two numbers in a number system of radix N, comprising first memory means for storing a number A having a numerical value between zero and N–1, second memory means for storing a number B having a numerical value between zero and N–1, a first plurality of two-input and-gates, one input of each connected to said first memory means so that only one such gate, determined by the stored number A, will conduct electric pulses transmitted to the other input, a pulse generator, a first delay-line means having an input terminal connected to receive pulses from said generator, said first delay-line means having a plurality of output terminals arranged and connected to supply electric pulses to the and-gates of said first plurality successively at one-unit time intervals following the receipt of a pulse from said generator, whereby the period of time between the receipt of a pulse from said generator and transmission of such a pulse by one of the first plurality of and-gates is representative of the stored number A, a second plurality of two-input and-gates, one input of each connected to said second memory means so that only one such gate, determined by the stored number B, will conduct electric pulses transmitted to the other input, a second delay-line means having an input terminal connected to receive pulses transmitted by said first plurality of and-gates, said second delay-line means having a plurality of output terminals arranged and connected to supply electric pulses to the and-gates of said second plurality successively at one-unit time intervals, whereby the period of time between receipt of a pulse from said first plurality of and-gates and transmission of such a pulse by the second plurality of and-gates is representative of the algebraic sum of the stored numbers A and B, and a plurality of coincidence gates connected to receive the pulses transmitted by said second plurality of and-gates, means for supplying electric pulses to said coincidence gates successively at one-unit time intervals following the receipt of a pulse from said generator, whereby a coincidence of pulses occurs at only one coincidence gate determined by the algebraic sum of A and B, means for combining pulses transmitted by pairs of coincidence gates representing algebraic sums that differ by an amount equal to the radix N, said combining means connected between the outputs of each of the two gates of said pairs of coincidence gates, means for changing the value stored in the first memory means to a value equal to said sum if said sum is less than the radix of the number system employed, or equal to said sum minus the radix if said sum is not less than the radix, and means for automatically clearing the stored number from said second memory means after the addition of the number B.

6. A circuit as in claim 5, additionally comprising means for supplying a pulse representing a carry to a following stage whenever a coincidence of pulses occurs at a gate representing an algeraic sum larger than N–1, third memory means for storing a carry from a preceding stage, switching means connected between said first plurality of and-gates and second delay-line means, and third delay-line means connected between said switching means and said coincidence gates, said switching means being connected to and controlled by said third memory means and said switching means being connected and arranged to transmit pulses from said first plurality of and-gates to said second delay-line means when there is no stored carry, and through said third delay-line means to said coincidence gates when there is a stored carry.

7. A circuit as in claim 5, wherein said second delay-line means has input terminals at opposite ends thereof, additionally comprising switching means for supplying the pulses transmitted from the first plurality of and-gates to the input terminal at one end of the second delay-line means when the number B is to be added, and for supplying such pulses to the input terminal at the opposite end of the second delay-line means when the number B is to be subtracted.

8. A circuit for adding two numbers in a number system of radix N, comprising first memory means for storing a number A having a numerical value between zero and N-1, second memory means for storing a numerical value between zero and N-1, a first plurality of two-input and-gates, one input of each connected to said first memory means so that only one such gate, determined by the stored number A, will conduct electric pulses transmitted to the other input, a pulse generator, first delay-line means having an input terminal connected to receive pulses from said generator, said first delay-line means having a plurality of output terminals arranged and connected to supply electric pulses to the and-gates of said first plurality successively at one-unit time intervals following the receipt of a pulse from said generator, whereby the period of time between the receipt of a pulse from said generator and transmission of such a pulse by one of the first plurality of and-gates is representative of the stored number A, a second plurality of two-input and-gates, one input of each connected to said second memory means so that only one such gate, determined by the stored number B, will conduct electric pulses transmitted to the other input, second delay-line means having an input terminal arranged and connected to receive pulses in fixed time relation to the pulses supplied by said generator, said second delay-line means having a plurality of output terminals arranged and connected to supply electric pulses to the and-gates of said second plurality successively at one-unit time intervals, whereby the period of time between receipt of a pulse from said generator and transmission of such a pulse by the second plurality of and-gates is representative of the stored number B, the combined time interval between the transmission of a pulse by said generator and transmission of a pulse by said first plurality of and-gates, and between the transmission of a pulse by said generator and the transmission of a pulse by the second plurality of and-gates being representative of the algebraic sum of A and B, a plurality of coincidence gates connected to receive the pulse transmitted by said second plurality of and-gates, means for supplying electric pulses to said coincidence gates successively at one-unit time intervals following the transmission of a pulse by said first plurality of and-gates, whereby a coincidence of pulses occurs at only one coincidence gate determined by the algebraic sum of A and B, means for combining pulses transmitted by pairs of coincidence gates representing algebraic sums that differ by an amount equal to the radix N, said combining means connected between the outputs of each of the two gates of said pairs of coincidence gates, means for changing the value stored in the first memory means to a value equal to said sum if said sum is less than the radix of the number, or equal to said sum minus the radix if said sum is not less than the radix, and means for automatically clearing the stored number from said second memory means after the addition of the number B.

9. A circuit as in claim 8, additionally comprising means for supplying a pulse representing a carry to a following stage whenever a coincidence of pulses occurs at a gate representing an algebraic sum larger than N-1, third memory means for storing a carry from a preceding stage, switching means connected ahead of the input terminal to said second delay-line means, and third delay-line means connected between said switching means and said coincidence gates, said switching means being connected to and controlled by said third memory means, and said switching means being connected and arranged to transmit pulses to said second delay-line means when there is no stored carry, and through said third delay-line means to said third coincidence gate when there is a stored carry.

10. A circuit as in claim 8, wherein said second delay-line means has input terminals at opposite ends thereof, additionally comprising switching means for supplying pulses to the input terminal at one end of the second delay-line means when the number B is to be added, and for supplying such pulses to the input terminal at the opposite end of the second delay-line means when the number B is to be subtracted.

References Cited in the file of this patent

UNITED STATES PATENTS

| 2,920,821 | Gallichotte | Jan. 12, 1960 |
| 2,920,822 | Gallichotte | Jan. 12, 1960 |